United States Patent
Bent et al.

(10) Patent No.: US 9,870,168 B1
(45) Date of Patent: Jan. 16, 2018

(54) KEY-VALUE STORE WITH INTERNAL KEY-VALUE STORAGE INTERFACE

(71) Applicant: EMC Corporation, Hopkinton, MA (US)

(72) Inventors: John M. Bent, Los Alamos, NM (US); Sorin Faibish, Newton, MA (US); Dennis P. J. Ting, Groton, MA (US); Percy Tzelnic, Concord, MA (US); Uday Gupta, Westford, MA (US); Gary Grider, Los Alamos, NM (US); David J. Bonnie, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 12 days.

(21) Appl. No.: 14/579,323

(22) Filed: Dec. 22, 2014

(51) Int. Cl.
G06F 13/12 (2006.01)
G06F 7/00 (2006.01)
G06F 17/30 (2006.01)
G06F 3/06 (2006.01)

(52) U.S. Cl.
CPC ............ G06F 3/0647 (2013.01); G06F 3/067 (2013.01); G06F 3/0614 (2013.01)

(58) Field of Classification Search
CPC ....... G06F 3/0647; G06F 3/0614; G06F 3/067
USPC ........... 710/74; 707/690, 750, 738, 755, 736
See application file for complete search history.

(56) References Cited

U.S. PATENT DOCUMENTS

| | | | | |
|---|---|---|---|---|
| 5,668,877 A | * | 9/1997 | Aziz | H04L 9/0844 380/285 |
| 7,136,867 B1 | * | 11/2006 | Chatterjee | G06F 17/30961 707/690 |
| 7,710,426 B1 | * | 5/2010 | Bushell | H04N 19/426 345/543 |
| 8,868,576 B1 | * | 10/2014 | Faibish | G06F 17/30091 707/755 |
| 9,208,179 B1 | * | 12/2015 | Song | G06F 17/30067 |
| 2003/0191739 A1 | * | 10/2003 | Chatterjee | G06F 17/3056 |

(Continued)

OTHER PUBLICATIONS

"Level DB: A Fast persistent Key-Value Store", http://google-opensource.blogspot.com/2011/levbeldb-fast-persistent-key-value-store.html, downloaded on Dec. 9, 2014.

(Continued)

*Primary Examiner* — Farley Abad
*Assistant Examiner* — Henry Yu
(74) *Attorney, Agent, or Firm* — Ryan, Mason & Lewis, LLP

(57) ABSTRACT

A key-value store is provided having one or more key-value storage interfaces. A key-value store on at least one compute node comprises a memory for storing a plurality of key-value pairs; and an abstract storage interface comprising a software interface module that communicates with at least one persistent storage device providing a key-value interface for persistent storage of one or more of the plurality of key-value pairs, wherein the software interface module provides the one or more key-value pairs to the at least one persistent storage device in a key-value format. The abstract storage interface optionally processes one or more batch operations on the plurality of key-value pairs. A distributed embodiment for a partitioned key-value store is also provided.

22 Claims, 5 Drawing Sheets

```
dssd_persist(sst) {
    foreach key,value in sst {
        dssd->put(key,value); // maintaining semantic knowledge that they are keys
    }
}                                                                                    } 460 kinetic_persist ——— 470
...

posix_persist ——— 480
...

For DSSD batch API:
dssd_persist(sst) {
    batch=prepare_batch(sst);
    dssd->put_all(batch);
}
prepare_batch(sst) {                } 490
    batch = new collection();
    foreach key,value in sst
        batch.append(key,value)
    return batch
}
```

(56) References Cited

U.S. PATENT DOCUMENTS

| | | | | |
|---|---|---|---|---|
| 2006/0129368 A1* | 6/2006 | Smith | ............... | G06F 17/5022 703/14 |
| 2013/0138654 A1* | 5/2013 | Sathish | ............ | G06F 17/30784 707/738 |
| 2013/0346424 A1* | 12/2013 | Zhang | ............... | G06F 17/30616 707/750 |
| 2015/0150018 A1* | 5/2015 | Hu | ........................ | G06F 9/544 718/103 |

OTHER PUBLICATIONS

Rob Vagg, "LevelDB and Node: What is LevelDB Anyway?" http://dailyjs.com/2013/04/19/leveldb-and-node-1/, downloaded on Nov. 7, 2014.

Ilya Grigorik, "SSTable and Log Structured Storage: LevelDB", igvita.com.

John M. Bent, et al., "Parallel Storage System with Burst Buffer Appliance for Storage of Partitioned Key-Value Store Across a Plurality of Storage Tiers", U.S. Appl. No. 14/143,749, filed Dec. 30, 2013.

John M. Bent, et al., "Partitioned Key-Value Store with One-Sided Communications for Secondary Global Key Lookup by Range-Knowledgeable Clients", U.S. Appl. No. 14/143,758, filed Dec. 30, 2013.

John M. Bent, et al., "Parallel Sort with a Ranged, Partitioned Key-Value Store in a High Performance Computing Environment", U.S. Appl. No. 14/143,771, filed Dec. 30, 2013.

"OpenMP", http://en.m.wikipedia.org/wiki/OpenMP, downloaded Dec. 11, 2014.

Jessica A. Popp, "Fast Forward Storage and IO Program Documents", HPDD Community Space / HPDD Wiki Front Page, https://wiki.hpdd.intel.com/display/PUB/Fast+Forward+Storage+and+IO+Program+Documents, downloaded Dec. 18, 2014.

* cited by examiner

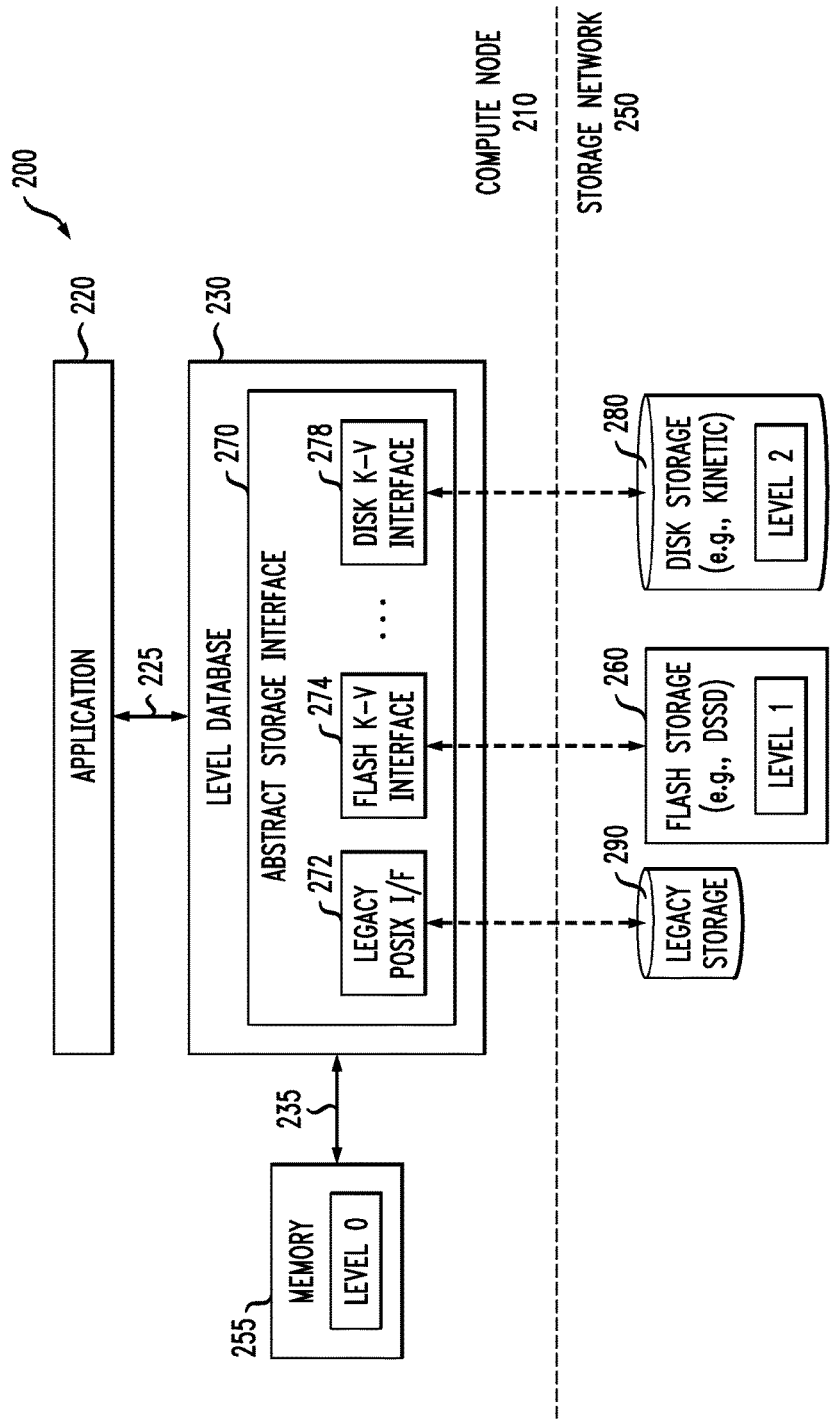

FIG. 3

```
# sst is a sorted table of keys
persist(sst,level) {
    fd=open(level,sst_file)
    foreach key,value in sst {
        write(fd,string(key),string(value))
    }
    ~~
}
~~
```
300

FIG. 4A

```
persist(sst,level) {
    abstract_storage.persist(sst,level)
    ~~
}
```
} 410

```
class abstract_storage {
    init() {
```
420

```
        // set up set of function pointer tables for each hardware device and map them to levels
        // read this info from a config file
    persist(sst,level) {
        children[level]->persist(sst)
```
} 430

```
┌─────────────────────────────────────────────────────────────────┐
│                                                            ⎫    │
│  dssd_persist(sst) {                                       ⎪    │
│    foreach key,value in sst {                              ⎬ 460 │
│      dssd->put(key,value); // maintaining semantic         ⎪    │
│                           knowledge that they are keys     ⎭    │
│    ~~                                                           │
│  kinetic_persist ──── 470                                       │
│    ...                                                          │
│  posix_persist ──── 480                                         │
│    ...                                                          │
│  For DSSD batch API:                                       ⎫    │
│  dssd_persist(sst) {                                       ⎪    │
│    batch=prepare_batch(sst);                               ⎪    │
│    dssd->put_all(batch);                                   ⎪    │
│    ~~                                                      ⎬ 490 │
│  prepare_batch(sst) {                                      ⎪    │
│    batch = new collection();                               ⎪    │
│    foreach key,value in sst                                ⎪    │
│      batch.append(key,value)                               ⎪    │
│    return batch                                            ⎭    │
│    ~~                                                           │
│                                                        ⟵ 400    │
└─────────────────────────────────────────────────────────────────┘
```

KEY-VALUE STORE WITH INTERNAL KEY-VALUE STORAGE INTERFACE

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The field relates generally to data storage, and more particularly, to key-value stores.

BACKGROUND

Key-value stores are powerful tools for storing and retrieving large amounts of data for activities such as data analysis. Generally, key-value stores can store pairs of keys and values, and can retrieve values when a key is known. Thus, in a key-value store, a key is a unique identifier for the object comprising the key-value pair. The keys often convey semantic meaning.

LevelDB is an example of an open source key-value store from Google, Inc. See, for example, Jeff Dean and Sanjay Ghemawat, "LevelDB: A Fast Persistent Key-Value Store," Google Open Source Blog, (Jul. 27, 2011). LevelDB stores keys and values in arbitrary byte arrays. For example, when LevelDB persists key-value information to storage, a Portable Operating System Interface (POSIX) is typically employed. The POSIX interface will store the key-value pairs by converting the key-value pairs to strings of bytes, and writing the converted key-value pairs as an array of bytes to storage. Therefore, the semantic information associated with the key-value data is lost.

A need therefore exists for improved techniques for storing key-value data to storage that maintain the semantic information associated with the stored key-value data. A further need exists for techniques for storing key-value data using a hardware accelerated key-value store for storage of key-value data on storage systems.

SUMMARY

Illustrative embodiments of the present invention provide a key-value store having one or more key-value storage interfaces. In one embodiment, a key-value store on at least one compute node comprises a memory for storing a plurality of key-value pairs; and an abstract storage interface comprising a software interface module that communicates with at least one persistent storage device providing a key-value interface for persistent storage of one or more of the plurality of key-value pairs, wherein the software interface module provides the one or more key-value pairs to the at least one persistent storage device in a key-value format. The abstract storage interface optionally processes one or more batch operations on the plurality of key-value pairs.

In a parallel embodiment, a distributed key-value store comprises a plurality of compute nodes connected by a network, wherein at least one of the compute nodes comprises a partitioned key-value store server; wherein the partitioned key-value store server is configured to store key-value data using a local key-value store, the local key-value store comprising an abstract storage interface comprising a software interface module that communicates with at least one persistent storage device providing a key-value interface for persistent storage of one or more key-value pairs, wherein the software interface module provides the one or more key-value pairs to the at least one persistent storage device in a key-value format.

The illustrative embodiments described herein provide significant improvements relative to conventional arrangements. In some of these embodiments, use of an abstract storage interface that provides key-value pairs to a persistent storage device in a key-value format allows semantic information to be maintained for persisted key-value data.

BRIEF DESCRIPTION OF THE DRAWINGS

FIG. 2 illustrates an exemplary key-value storage environment incorporating aspects of the present invention;

FIG. 3 illustrates exemplary pseudo code for a persistent storage operation by a conventional LevelDB key-value store of FIG. 1;

FIGS. 4A and 4B, collectively, illustrate exemplary pseudo code for the abstract storage interface of the LevelDB key-value store of FIG. 2.

DETAILED DESCRIPTION

Figure 1:
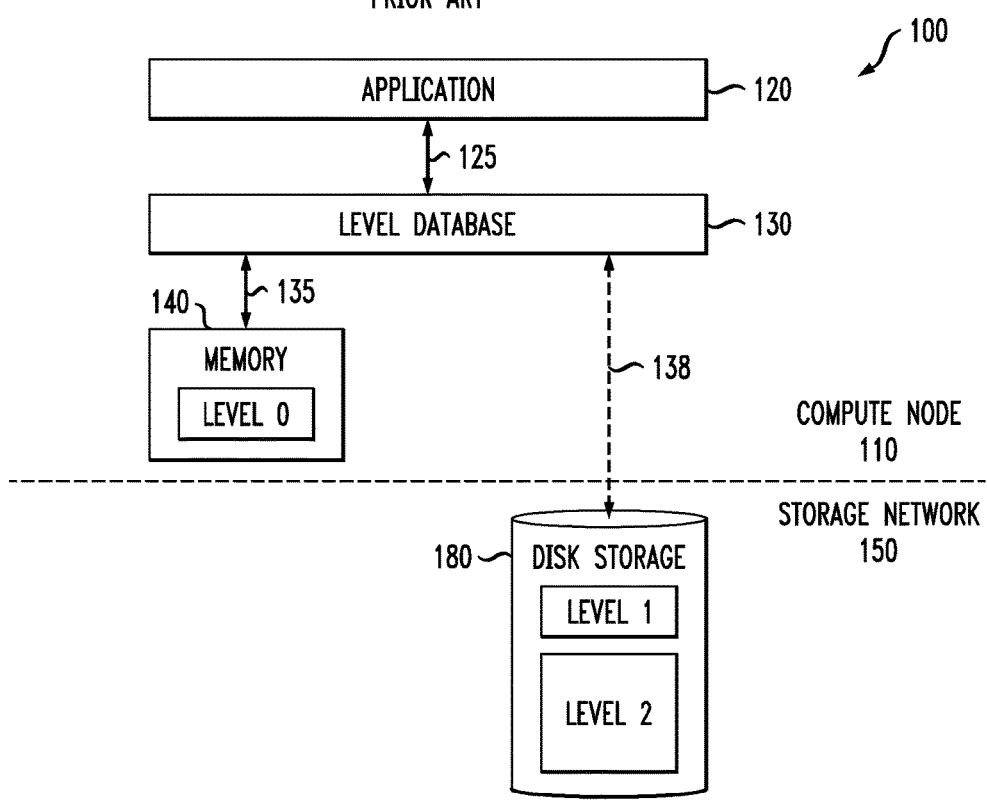
FIG. 1 illustrates an exemplary conventional key-value (KV) storage environment.

Illustrative embodiments of the present invention will be described herein with reference to exemplary key-value data stores and associated clients, servers, storage arrays and other processing devices. It is to be appreciated, however, that the invention is not restricted to use with the particular illustrative key-value data stores and device configurations shown. Accordingly, the term "key-value store" as used herein is intended to be broadly construed.

Aspects of the present invention provide key-value stores having one or more key-value storage interfaces that maintain semantic information when storing key-value data to storage. As noted above, when a conventional key-value store, such as LevelDB, persists key-value information to storage, the POSIX interface will store the key-value pairs by converting the key-value pairs to strings of bytes, and writing the converted key-value pairs as an array of bytes to storage. Therefore, the semantic information associated with the key-value data is lost. While the exemplary embodiment described herein employs exemplary LevelDB key-value stores, the present invention can be employed with other key-value stores, as would be apparent to a person of ordinary skill in the art.

In one exemplary embodiment of the present invention, an Abstract Storage Interface is included as a new storage layer in the key-value store to leverage knowledge of the storage destination, such as whether the storage destination provides a key-value storage interface.

A number of emerging storage devices provide a key-value interface. For example, the DSSD™ flash storage system from EMC Corp. comprises a key-value flash-based storage system and the Kinetic Open Storage platform from Seagate Technology LLC comprises a key-value disk-based storage system. In addition, ViPR™ is a software-defined Storage as a Service product from EMC Corp. that provides a key-value interface that will store key-value data and maintain semantic information. ViPR abstracts storage from disparate arrays into a single pool of storage capacity.

In this manner, the conversion of the key-value data to bytes for storage, as required by conventional techniques, is no longer required and semantic information can be maintained when storing key-value data to storage. The preserved semantic information can be stored by the key-value store in one or more persistent storage devices providing a key-value interface. The key-value store can store key-value data using direct key-value operations on the persistent storage hardware. As used herein, a hardware accelerated key-value store comprises a key-value store that is substantially optimized for the storage of key-value data and/or communication using keys and values, thereby allowing direct calls to the hardware layer.

According to one aspect of the invention, a key-value store, such as a LevelDB open source key-value store from Google, Inc., is modified to add an abstract storage interface into which key-value operations are applied, and then passed to one or more persistent storage devices providing a key-value interface. As discussed herein, the exemplary abstract storage interface supports batch operations so that groups of key-value pairs can be processed at once.

FIG. 1 illustrates an exemplary conventional key-value storage environment 100. As shown in FIG. 1, an exemplary application 120, on a compute node 110, can read, write and/or query key-value data in an exemplary key-value store 130, such as a LevelDB open source key-value store, using a key-value interface 125.

The exemplary LevelDB key-value store 130 stores "hot" data close to the application 120, typically in a local memory 140. Cold data is typically stored on one or more storage devices, such as a disk storage device 180, accessed over a storage network 150. The exemplary LevelDB key-value store 130 will tier and cache the key-value appropriately, in a known manner. The exemplary LevelDB key-value store 130 stores data in descending levels, such as levels 0-2 in the exemplary embodiment, in which each level is ten times as large as the previous level. For example, a simple two level tiering would have level0 in memory 140, and level1 on disk storage device 180. Level1 is ten times larger than level0 If the second level (level1) grows too large, then a level2 can be employed on disk storage device 180 as well. Level2 is ten times larger than level1.

The exemplary LevelDB key-value store 130 employs a key-value interface 135 when storing key-value data to level0 in memory 140 in the exemplary embodiment. The key-value data is stored in level0 in memory 140 as an in-memory tree.

The conventional LevelDB key-value store 130 employs a POSIX interface 138, however, when storing key-value data to level1 or level2 on disk storage device 180 in the exemplary embodiment. The key-value data is stored in level1 or level2 on disk storage device 180 as sorted string table files (SST), in a known manner. As noted above, the POSIX interface 138 will store the key-value pairs by converting the key-value pairs to strings of bytes, and writing the converted key-value pairs as an array of bytes to storage. Therefore, the semantic information associated with the key-value data stored on disk storage device 180 is lost.

Generally, the conventional LevelDB key-value store 130 writes key-value data to a log and a "memtable" in memory 140. The log is regularly flushed into the sorted string table files on disk storage device 180 where the data has a more permanent home. The conventional LevelDB key-value store 130 reads key-value data by merging these two distinct data structures; that is, the in-memory log file and the SST files. The basic operations in an exemplary LevelDB key-value store 130 comprise Get( ), Put( ), Del( ), and Batch( ).

FIG. 2 illustrates an exemplary key-value storage environment 200 incorporating aspects of the present invention. As shown in FIG. 2, an exemplary application 220, on a compute node 210, can read, write and/or query key-value data in an exemplary key-value store 230, such as a LevelDB open source key-value store, using a key-value interface 225.

The exemplary LevelDB key-value store 230 stores "hot" data close to the application 220, typically in a local memory 255, in a similar manner to the exemplary LevelDB key-value store 130 of FIG. 1. Cold data is typically stored on one or more storage devices accessed over a storage network 250. The exemplary LevelDB key-value store 230 will tier and cache the key-value appropriately, in a similar manner to the exemplary LevelDB key-value store 130 of FIG. 1. For example, the exemplary LevelDB key-value store 230 stores data in descending levels, such as levels 0-2 in the exemplary embodiment, in which each level is ten times as large as the previous level.

The exemplary LevelDB key-value store 230 employs a key-value interface 235 when storing key-value data to level0 in memory 255 in the exemplary embodiment. The key-value data is stored in level0 in memory 255 as an in-memory tree, in a similar manner to the exemplary LevelDB key-value store 130 of FIG. 1.

As noted above, one aspect of the invention modifies a key-value store 230, such as a LevelDB open source key-value store, to add an abstract storage interface 270 (storage layer) into which key-value operations are applied, and then passed to one or more persistent storage devices providing a key-value interface. Exemplary pseudo code for the abstract storage interface 270 is discussed below in conjunction with FIG. 4.

The abstract storage interface 270 provides a storage-specific interface for each type of storage destination, and can therefore leverage knowledge about the specific storage destination to ensure that the semantic information associated with the stored key-value data is maintained. Thus, the abstract storage interface 270 allows the LevelDB framework to run in a variety of environments, such as POSIX, and to leverage additional storage architectures that provide key-value interfaces, such as the DSSD™ flash storage system and the Kinetic Open Storage platform from Seagate Technology LLC referenced above. The abstract storage interface 270 performs the necessary conversions/translations to leverage, for example, flash and disk storage devices that provide key-value interfaces. In this manner, the LevelDB key-value store 230 provides a key-value interface between one or more local key-value stores and one or more additional storage devices having a key-value interface.

While the exemplary embodiments of the present invention employ DSSD™ flash storage system and the Kinetic Open Storage platform, other storage devices that provide key-value interfaces can be employed, as would be apparent to a person of ordinary skill in the art.

As shown in FIG. 2, the exemplary abstract storage interface 270 comprises a legacy POSIX interface (I/F) 272 for storing key-value data in one or more legacy storage devices 290 (i.e., non-key-value-aware stores such as simple POSIX file systems). In addition, the exemplary abstract storage interface 270 comprises a flash key-value interface 274 for storing key-value data in one or more flash storage devices 260 providing a key-value interface, such as a DSSD™ flash storage device, and a disk key-value interface 278 for storing key-value data in one or more disk storage devices 280 providing a key-value interface, such as a Kinetic disk storage device from Seagate Technology LLC.

In the exemplary embodiment, the key-value data is stored in level1 or level2 on one or more flash storage devices 260 or on one or more disk storage devices 280, respectively, as SST files, in a known manner.

The flash key-value interface 274 and the disk key-value interface 278 store the key-value pairs by writing the key-value pairs directly to the respective storage 260 or 280. Therefore, the semantic information associated with the key-value data stored on storage 260 and/or 280 is maintained.

With semantic knowledge in the one or more flash storage devices 260 and/or one or more disk storage devices 280, processors in these storage devices can assist with operations such as index building, reorganization, resorting, deduplication and compression.

Memory buffering can be achieved with the present invention in existing flash storage devices that don't provide a memory buffer using the level0 in-memory tree on memory 255.

A parallel implementation of the key-value storage environment 200 of FIG. 2 is discussed further below in conjunction with FIG. 2.

The basic operations in an exemplary LevelDB key-value store 230 comprise Get( ), Put( ), Del( ), and Batch( ).

While the exemplary embodiment employs flash memory as a high-speed memory, other types of low-latency memory could be used instead of flash memory. Typically, such low-latency memories comprise electronic memories, which may be implemented using non-volatile memories, volatile memories or combinations of non-volatile and volatile memories. Accordingly, the term "flash-based key-value storage device" as used herein is intended to be broadly construed, so as to encompass any network appliance or other arrangement of hardware and associated software or firmware that collectively provides a high-speed memory.

According to another aspect of the invention, the various levels of the exemplary LevelDB key-value store 230, such as levels 0-2 can be tied to a different hardware tier. For example, the first LevelDB storage tier would use memory 255 for level0 (as shown in FIG. 2) and then use one or more additional LevelDB tiers for subsequent levels. A second exemplary LevelDB tier could use the exemplary flash storage device 260 for level1 and a third exemplary LevelDB tier could use the exemplary disk storage device 280 for subsequent levels. In one embodiment, the third exemplary LevelDB tier could use NVRAM (non-volatile random access memory) in a storage controller for level0 and then use disk storage drives for subsequent levels.

In yet another aspect of the invention, different instances of the exemplary LevelDB key-value store 230 can be tied to a different hardware tier.

The exemplary flash storage device 260 and disk storage device 280 in the present embodiment are optionally arranged into first and second storage tiers, although it is to be appreciated that more than two storage tiers may be used in other embodiments. In addition, an embodiment of the invention can be configured with only one of the exemplary flash storage device 260 and disk storage device 280. Each of the exemplary flash storage device 260 and disk storage device 280 may be viewed as being representative of an object storage target of a corresponding object storage server. The first and second storage tiers comprise respective disjoint subsets of the object storage servers.

The different storage tiers 260 and 280 in this embodiment comprise different types of storage devices having different performance characteristics. The flash storage devices 260 are generally significantly faster in terms of read and write access times than the disk storage devices 280. The flash storage devices 260 are therefore considered "fast" devices in this embodiment relative to the "slow" disk storage devices. Accordingly, the exemplary key-value storage environment 200 may be characterized in the present embodiment as having a "fast" storage tier 260 and a "slow" storage tier 280, where "fast" and "slow" in this context are relative terms and not intended to denote any particular absolute performance level. These storage tiers comprise respective disjoint subsets of object storage servers and their associated object storage targets. However, numerous alternative tiering arrangements may be used, including three or more tiers, each providing a different level of performance. The particular storage devices used in a given storage tier may be varied in other embodiments and multiple distinct storage device types may be used within a single storage tier.

The flash storage device 260 may be implemented, by way of example, using respective flash Peripheral Component Interconnect Express (PCIe) cards or other types of memory cards installed in a computer or other processing device that implements the corresponding object storage server. Numerous alternative arrangements are possible. Also, a variety of other types of non-volatile or volatile memory in any combination may be used to implement at least a portion of the flash storage device 260. Examples of alternatives to flash storage devices that may be used as respective object storage targets in other embodiments of the invention include non-volatile memories such as magnetic random access memory (MRAM) and phase change random access memory (PC-RAM).

The flash storage device 260 generally provides higher performance than the disk storage device(s) 280, but the disk storage device(s) 280 generally provides higher capacity at lower cost than the flash storage device 260. The exemplary tiering arrangement of FIG. 2 therefore makes it possible to dynamically balance the conflicting requirements of storage capacity and input/output (IO) throughput, thereby avoiding situations in which either performance is less than optimal, or the costs of implementing the system become excessive. Arrangements of this type can provide further acceleration of IO operations in the exemplary key-value storage environment 200, leading to enhanced system performance relative to conventional arrangements, while additionally or alternatively providing an ability to achieve particular levels of performance at lower cost.

FIG. 3 illustrates exemplary pseudo code 300 for a persistent storage operation by a conventional LevelDB key-value store 130 (FIG. 1). As shown in FIG. 3, the exemplary pseudo code 300 allows the LevelDB key-value store 130 to persistently store key-value data to persistent storage, such as disk storage, using a POSIX interface (as discussed above in conjunction with FIG. 1). For a given level, such as level1, and SST file, the exemplary pseudo code 300 will convert the key-value data contained therein to a string of bytes that is written to a persistent storage device over the POSIX interface.

FIGS. 4A and 4B, collectively, illustrate exemplary pseudo code 400 for the abstract storage interface 270 of the LevelDB key-value store 230 (FIG. 2) in accordance with aspects of the present invention. As shown in FIG. 4A, the persistent storage operation 300 of the conventional LevelDB key-value store 130 is replaced by code portion 410 to provide an abstract_storage.persist(sst,level) definition for the abstract storage interface 270.

An abstract storage class 420 is provided with function pointer tables for each hardware device, such as the exemplary flash storage device 260 and disk storage device 280, and a mapping of each hardware device to a corresponding level, in a known manner. For an exemplary abstract storage implementation, see, for example, the abstract storage implementation for plfs/plfs-core, downloadable from https://github.com/plfs/plfs-core/tree/master/src/IOStore, and incorporated by reference herein. The exemplary pseudo code 400 provides the necessary code 430 to set up virtual classes to define the sets of functions.

The exemplary pseudo code 400 for the abstract storage interface 270 provides an interface implementation for each supported storage architecture. As noted above in conjunction with FIG. 2, the exemplary abstract storage interface 270 comprises a legacy POSIX interface 272 for storing key-value data in one or more legacy storage devices 290, a flash key-value interface 274 for storing key-value data in one or more flash storage devices 260 (e.g., DSSD) providing a key-value interface, and a disk key-value interface 278 for storing key-value data in one or more disk storage devices 280 (e.g., Kinetic) providing a key-value interface.

Thus, the exemplary pseudo code 400 provides a DSSD persist implementation 460 that provides a hardware application programming interface (API) to store key-value data semantically on the one or more flash storage devices 260 (e.g., DSSD) providing a key-value interface. A put operation is called for each key-value pair in the indicated SST file, to natively store each key-value pair and thereby maintain the semantic knowledge associated with the keys.

Likewise, the exemplary pseudo code 400 provides a Kinetic persist implementation 470 that provides a hardware application programming interface (API) to store key-value data semantically on the one or more disk storage devices 280 (e.g., Kinetic) providing a key-value interface. The Kinetic persist implementation 470 would be implemented in a similar manner as the DSSD persist implementation 460, while being tailored to the environment of a disk storage device 280 (e.g., Kinetic) providing a key-value interface, as would be apparent to a person of ordinary skill in the art.

The exemplary pseudo code 400 also provides a POSIX persist implementation 480 that provides a hardware application programming interface (API) to store key-value data in one or more legacy storage devices 290 (i.e., non-key-value-aware stores such as simple POSIX file systems). It is noted that the POSIX persist implementation 480 converts the key-value data for storage as an array of bytes, as described above, and the semantic information is not maintained. The POSIX persist implementation 480 would be implemented in a similar manner as the exemplary pseudo code 300 for a persistent storage operation by a conventional LevelDB key-value store 130, as discussed above in conjunction with FIG. 3, as would be apparent to a person of ordinary skill in the art.

In one exemplary implementation, multiple requests are aggregated into "batches" to send fewer messages over the network. Thus, the exemplary pseudo code 400 provides batch code 490 for a batch API for the exemplary DSSD™ flash storage devices 260. A batch is prepared comprising the key-value pairs in an SST file and a put command is executed to natively store the batch of key-value pairs on one or more exemplary DSSD™ flash storage devices 260 with the associated semantic information. The exemplary prepare_batch code appends each key-value pair to the batch under construction.

PARALLEL KEY-VALUE STORE ENVIRONMENT

One difficulty in creating key-value stores is the need for parallelism. The large amount of data that must be stored makes a key-value store on a single node, such as the compute node 110 of FIG. 1, impractical for most workloads. Thus, distributed key-value stores have been proposed for storing a key-value store (often referred to as a partitioned data store) on a number of parallel nodes.

Multidimensional Data Hashing Indexing Middleware (MDHIM) is an example of a framework for partitioned data stores. In a typical MDHIM implementation, one or more MDHIM clients run on a corresponding compute node and communicate with a plurality of MDHIM servers also running on the same or different compute nodes in a parallel file system. Each MDHIM server stores a partition of the key-value store. A given MDHIM server storing a particular sub-range of the key-value store is contacted to read or write key-values within the sub-range. Thus, MDHIM can be employed to scale the standalone embodiment of FIG. 1 to provide a distributed key-value store environment.

Figure 5:
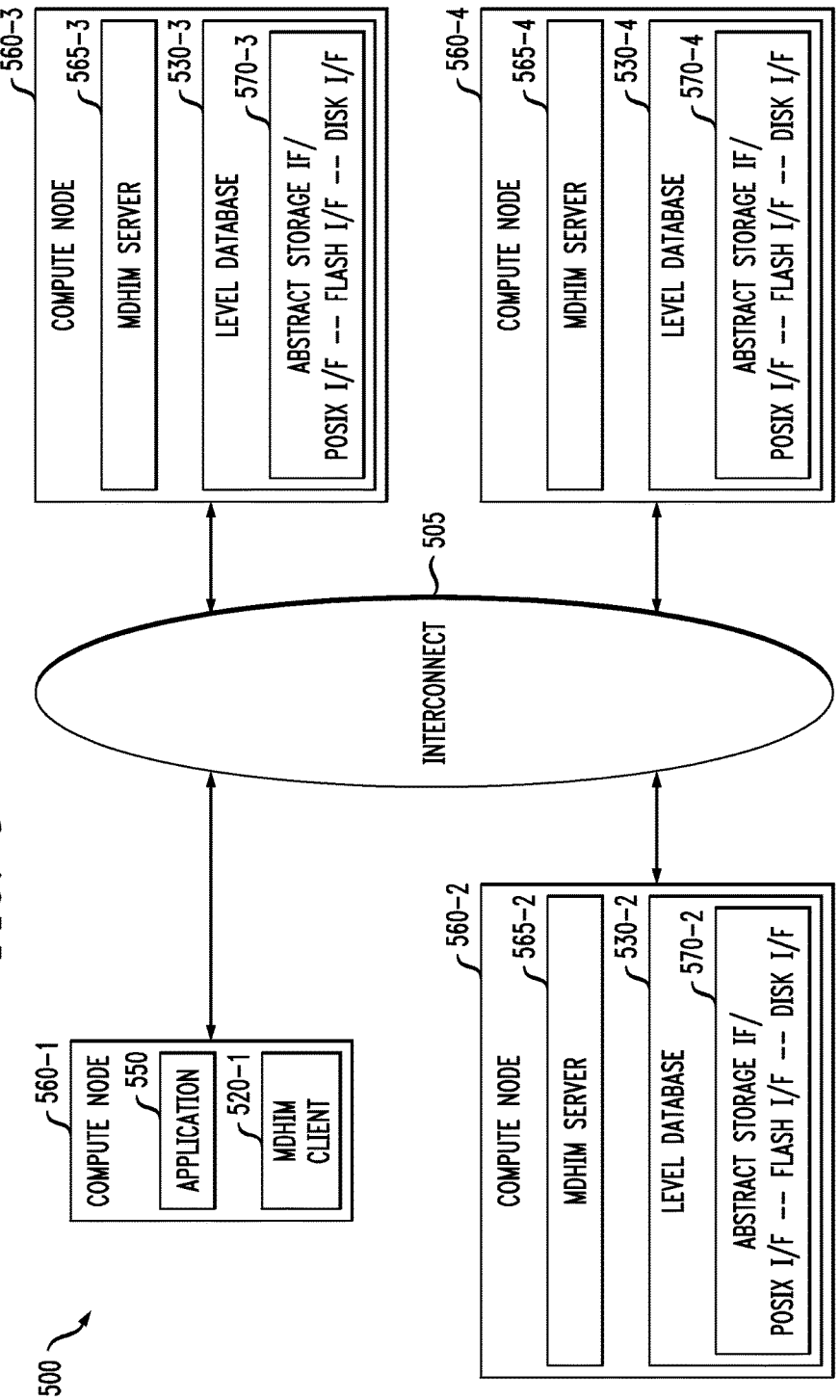
FIG. 5 illustrates an exemplary distributed key-value store environment incorporating aspects of the invention.

FIG. 5 illustrates an exemplary distributed key-value store environment 500 incorporating aspects of the invention. As shown in FIG. 5, the exemplary distributed key-value store environment 500 comprises an exemplary application, such as application 550, on a first compute node 560-1 that can read, write and/or query key-value data in the exemplary distributed key-value store environment 500, using one or more MDHIM clients, such as the exemplary MDHIM client 520-1.

One or more MDHIM servers 565-2 through 565-4, on one or more corresponding compute nodes 560-2 through 560-4, control the storage of key-value data on one or more storage devices (not shown in FIG. 5), such as the exemplary flash storage device 260 and disk storage device 280. As shown in FIG. 5, each MDHIM server 565 employs a corresponding exemplary LevelDB key-value store 530-2, 530-3, 530-4 to store key-value data on one or more storage devices (not shown in FIG. 5), such as the exemplary flash storage device 260 and disk storage device 280, using a corresponding abstract storage interface 570-2, 570-3, 570-4. The LevelDB key-value store 530 and corresponding abstract storage interface 570 operate in a similar manner to the corresponding devices discussed above in conjunction with FIG. 2. As shown in FIG. 5, each exemplary abstract storage interface 570 comprises specialized APIs for communicating with POSIX interfaces, flash storage devices and/or disk storage devices, in a similar manner to the exemplary abstract storage interface 270 of FIG. 2.

One challenge in a distributed key-value store environment 500 is the amount of key-value data that must be transferred, stored and processed. Thus, MDHIM employs low-latency Message Passing Interface (MPI) communications over an interconnect 505 across the user-space of high performance computing (HPC) compute nodes 560 to create a single virtual key-value store across a set of local key-value stores using ordered key-ranges.

While the exemplary parallel embodiments of the present invention employ MDHIM, other MPI-linked partitioned data stores can be employed, as would be apparent to a person of ordinary skill in the art. For a more detailed discussion of MDHIM, see, for example, James Nunez et al., "Multidimensional Data Hashing Indexing Metadata/ Middleware (MDHIM) Project," Ultrascale Systems Research Center, High Performance Computing Systems Integration (2012-2013), incorporated by reference herein.

The exemplary MDHIM application programming interface (API) comprises the following exemplary operations:

MDHIM init—initializes MDHIM structures and creates range server threads;

MDHIM_PUT—put one or more keys in a data store;

MDHIM_GET—get one or more keys from the data store;

MDHIM insert—a list function that inserts new records with key and record data;

MDHIM flush—makes key distribution information available to MDHIM clients;

MDHIM find—find a record using primary key (match, best higher or lower) and set the absolute record number;

MDHIM close—close an MDHIM file; and

MDHIM read—a list function that reads records (key and data), using absolute record numbers.

The nodes 560-1 through 560-4 (or portions thereof), comprising a processor, memory and network interface components as described above, are examples of what is more generally referred to herein as a "processing device." Each of the devices herein may similarly be implemented as a processing device comprising a processor, memory and network interface components. Thus, one or more of the exemplary nodes 560-1 through 560-4 in the exemplary distributed key-value store environment 500 comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also optionally included in one or more of the exemplary nodes 560-1 through 560-4 is network interface circuitry. The network interface circuitry allows the exemplary nodes 560 to communicate over the interconnect network 505 with other devices. The network interface circuitry may comprise, for example, one or more conventional transceivers.

An exemplary embodiment of the invention sorts the local key-values locally by the local store and globally by the overall MDHIM framework. The local and global sorting can be leveraged to provide batch input/output operations that aggregate multiple requests into batch operations on one or more sorted ranges. In this manner, desired data can be obtained using a reduced number of messages over the network. For a more detailed discussion of key sorting techniques, see, for example, U.S. patent application Ser. No. 14/143,758, filed Dec. 30, 2013, entitled "Partitioned Key-Value Store With One-Sided Communications for Secondary Global Key Lookup by Range-Knowledgeable Clients," and/or U.S. patent application Ser. No. 14/143,771, filed Dec. 30, 2013, entitled "Parallel Sort with a Ranged, Partitioned Key-Value Store in a High Performance Computing Environment," (now U.S. Pat. No. 9,245,048) each incorporated by reference herein.

CONCLUSION

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the partitioned key-value stores of the present invention. Such components can communicate with other elements of the partitioned key-value store over any type of network or other communication media.

As indicated previously, components of an exemplary key-value storage environment 200 as disclosed herein can be implemented at least in part in the form of one or more software programs stored in memory and executed by a processor of a processing device. A memory having such program code embodied therein is an example of what is more generally referred to herein as a "computer program product."

The exemplary key-value storage environment 200 or portions thereof may be implemented using one or more processing platforms each comprising a plurality of processing devices. Each such processing device may comprise processor, memory and/or network interface components.

As indicated above, storage of key-value data using key-value interfaces such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of key-value stores and associated clients, servers and other processing devices that can benefit from the secondary global key look-up functionality as described herein. Also, the particular configurations of system and device elements shown in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A key-value store on at least one compute node, comprising:

a memory for storing a plurality of key-value pairs, wherein keys in said key-value pairs comprise semantic information; and an abstract storage interface comprising a software interface module that communicates with at least one persistent storage device providing a key-value interface for persistent storage of one or more of said plurality of key-value pairs, wherein said software interface module provides said one or more key-value pairs to said at least one persistent storage device in a key-value format that maintains said semantic information of said keys in said key-value pairs.

2. The key-value store of claim 1, wherein said at least one persistent storage device comprises one or more of a flash storage device providing a key-value interface and a disk storage device providing a key-value interface.

3. The key-value store of claim 2, wherein said flash storage device providing said key-value interface and said disk storage device providing said key-value interface comprise respective disjoint subsets of storage.

4. The key-value store of claim 1, wherein said abstract storage interface processes one or more batch operations on said plurality of key-value pairs.

5. The key-value store of claim 1, wherein said abstract storage interface provides a storage-specific interface for a plurality of storage destination types.

6. The key-value store of claim 1, wherein said abstract storage interface provides a key-value interface between one or more local key-value stores and one or more additional storage devices having a key-value interface.

7. The key-value store of claim 1, wherein a processor in said at least one persistent storage device performs one or more of index building, reorganization, resorting, deduplication and compression of said one or more key-value pairs.

8. A distributed key-value store, comprising:
a plurality of compute nodes connected by a network, wherein at least one of said compute nodes comprises a partitioned key-value store server;
wherein the partitioned key-value store server is configured to store key-value data using a local key-value store, wherein keys in said key-value data comprise semantic information, said local key-value store comprising an abstract storage interface comprising a software interface module that communicates with at least one persistent storage device providing a key-value interface for persistent storage of one or more key-value pairs, wherein said software interface module provides said one or more key-value pairs to said at least one persistent storage device in a key-value format that maintains said semantic information of said keys in said key-value pairs.

9. The distributed key-value store of claim 8, wherein the partitioned key-value store server is configured to communicate with a plurality of partitioned key-value store clients over a network and to process requests from said plurality of partitioned key-value store clients.

10. The distributed key-value store of claim 8, wherein the partitioned key-value store server is further configured to communicate with one or more additional partitioned key-value store servers over a network and to process requests from said one or more additional partitioned key-value store servers.

11. The distributed key-value store of claim 8, further comprising at least one additional partitioned key-value store server, wherein each partitioned key-value store server stores a globally sorted range of keys.

12. The distributed key-value store of claim 8, further comprising at least one additional partitioned key-value store server, wherein each partitioned key-value store server stores a locally sorted range of keys within a set of string table files (SST).

13. The distributed key-value store of claim 8, further comprising at least one additional partitioned key-value store server, wherein at least one of said partitioned key-value store servers processes one or more batch operations on one or more sorted ranges of keys.

14. A method comprising:
providing a key-value store server on at least one compute node of a distributed storage system for storing a plurality of key-value pairs, wherein keys in said key-value pairs comprise semantic information; and
communicating with at least one persistent storage device providing a key-value interface for persistent storage of one or more of said plurality of key-value pairs using an abstract storage interface comprising a software interface module, wherein said software interface module provides said one or more key-value pairs to said at least one persistent storage device in a key-value format that maintains said semantic information of said keys in said key-value pairs.

15. The method of claim 14, wherein said at least one persistent storage device comprises one or more of a flash storage device providing a key-value interface and a disk storage device providing a key-value interface.

16. The method of claim 14, wherein said abstract storage interface processes one or more batch operations on said plurality of key-value pairs.

17. The method of claim 14, wherein said abstract storage interface provides a storage-specific interface for a plurality of storage destination types.

18. The method of claim 14, wherein said abstract storage interface provides a key-value interface between one or more local key-value stores and one or more additional storage devices having a key-value interface.

19. The method of claim 14, wherein a processor in said at least one persistent storage device performs one or more of index building, reorganization, resorting, deduplication and compression of said one or more key-value pairs.

20. The method of claim 14, wherein said key-value store server comprises a partitioned key-value store server configured to communicate with one or more additional partitioned key-value store servers over a network and to process requests from said one or more additional partitioned key-value store servers.

21. The key-value store of claim 6, wherein said one or more local key-value stores comprise a different hardware tier comprising respectively disjoint subsets of storage relative to said one or more additional storage devices.

22. The method of claim 18, wherein said one or more local key-value stores comprise a different hardware tier comprising respectively disjoint subsets of storage relative to said one or more additional storage devices.

* * * * *